June 24, 1930.  F. C. FRASER  1,767,444
TREE FALLING AND LOWERING DEVICE
Filed May 2, 1928   2 Sheets-Sheet 2
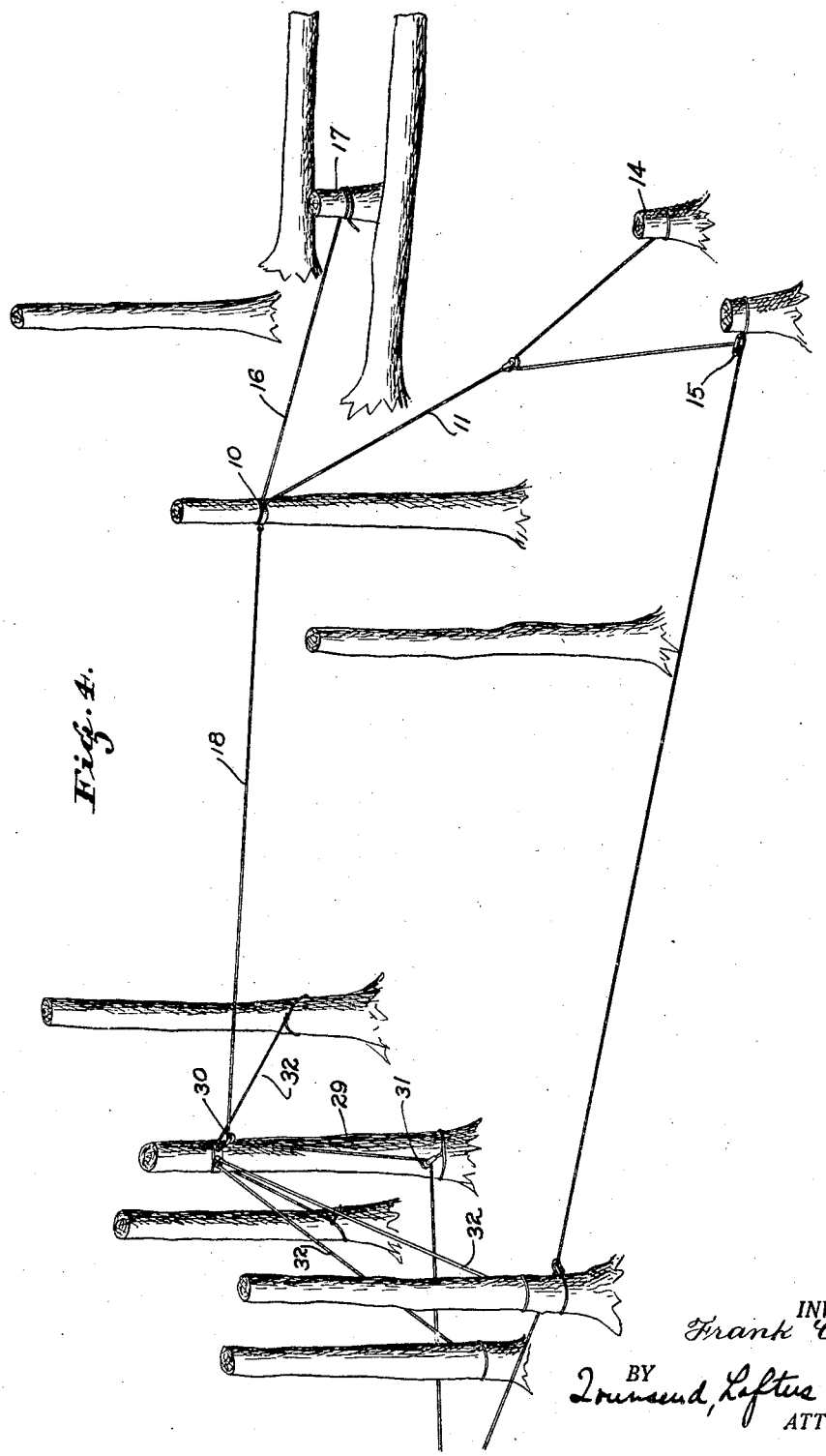
INVENTOR.
Frank C. Fraser.

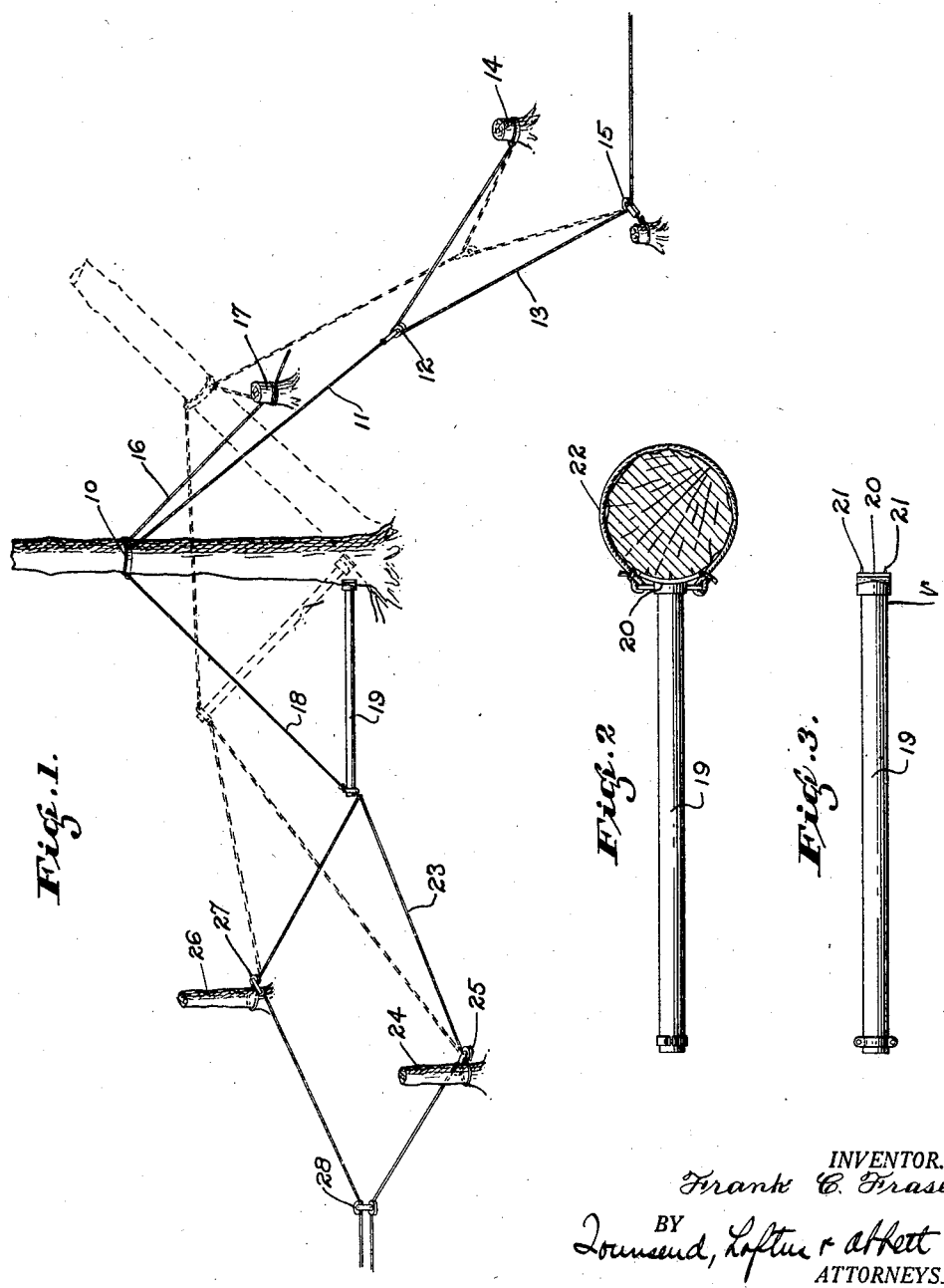

Patented June 24, 1930

1,767,444

UNITED STATES PATENT OFFICE

FRANK C. FRASER, OF FORTUNA, CALIFORNIA

TREE FALLING AND LOWERING DEVICE

Application filed May 2, 1928. Serial No. 274,455.

This invention relates to the falling and lowering of trees.

In the falling of large trees in lumbering operations, a considerable loss is suffered through splintering of the trees, by reason of the fact that the tree when felled frequently strikes a stump or hillock and splinters throughout a considerable portion of its length, resulting in much waste of lumber. This loss is considerable, especially in redwood timber.

The present invention has for one of its objects to provide for controlled and accurate lowering of the tree, whereby it may be lowered gently to the ground in the desired location. A further object is to permit of falling of trees without the usual sawing or cutting operations. In other words, the same apparatus used for lowering the tree may be employed to uproot the tree; thus making available lumber which would otherwise be wasted in stumpage.

Two forms of my invention are illustrated in the accompanying drawing, in which

Fig. 1 shows a perspective view of the rigging;

Fig. 2 shows a plan view of the strut employed in connection therewith;

Fig. 3 shows a side elevation of the strut;

Fig. 4 shows a perspective view of a modified arrangement.

Referring in detail to Fig. 1 of the drawing, the rigging comprises a strap or band 10 passing around the tree to be felled, and positioned at a considerable height thereon. A line 11 is fastened to this band and connects with a block or sheave 12, through which runs a pull line 13. One end of this pull line is anchored to a stump or deadman 14, and the said pull line passes out through a guide sheave to a suitable power apparatus. A guide line 16 is secured to the band 10 and extends at an angle to the line 11, and is fastened to a stump or other anchorage 17.

On the side of the tree opposite the pull line a guy line 18 is fastened to the band 10 and connects to the outer end of a strut 19, which strut rests against the base of the tree. The inner end of this strut is preferably provided with a plate 20 having spikes 21 to enter the tree, so as to prevent slippage, and it may also be desirable to secure the strut to the tree by means of a rope 22 or the like, passing around the tree.

A hold-back line 23 is fastened to the outer end of the strut, one branch of this line being led out at an angle to a stump 24, where it passes through sheaves 25, and the other branch being led to a stump 26, where it passes through sheaves 27, both branches thence passing through guide sheaves 28 and out to a suitable braking or hold-back device, not shown. I show the hold-back line looped around the stumps 24 and 26, thus obtaining a snubbing action to aid in the holding back.

In the use of this rigging, the location where it is desired to fall the tree is first determined, and the guide and pull lines arranged accordingly. On the opposite side of the tree, the hold-back rigging is set up. Power is then applied to the line 13, and as the tree begins to fall, the hold-back lines are brought into operation, so that the tree will be gradually lowered, as indicated in dotted lines in Fig. 1.

In Fig. 4 I show an arrangement wherein a tree or spar 29 is employed in place of the strut 19. The hold-back line runs through a sheave 30 fastened at a considerable height to the spar tree, thence through a sheave 31 near the bottom of the spar tree, and out to the braking device. The spar tree is provided with guy lines 32.

The present method of falling trees has the further advantage that other trees of small growth may be protected; whereas under prior methods these small trees are frequently destroyed by being struck by large falling trees.

Various changes in the construction and arrangement of the several parts herein described may be employed without departing from the spirit of my invention as disclosed in the appended claims.

Having thus described my invention, what I claim as new and desire to secure by Letters Patent is:

1. A device for falling and lowering trees, comprising a pull line secured to the tree at a considerable height from the ground, a guide line secured to the tree and to an anchor, a hold-back line secured to the tree on the side opposite the pull line, and means spaced from the tree for guiding the hold-back line during the lowering of the tree.

2. A device for falling and lowering trees comprising a pull line secured to the tree and to an anchor, a strut resting upward of the base of the tree and extending substantially horizontally away from the tree and being guyed to the tree, and a hold-back line having two diverging branches and being secured to said strut.

3. A device for falling and lowering trees comprising a pull line secured to the tree at a considerable height from the ground, a guide line secured to the tree and to an anchor, a strut secured upward of the base of the tree and extending substantially horizontally away from the tree, and a hold-back line having a plurality of diverging branches and secured to said strut.

FRANK C. FRASER.